July 15, 1930.　　　L. G. VACHON ET AL　　　1,770,537
REPRODUCING APPARATUS
Filed May 27, 1929　　　4 Sheets-Sheet 1

LAWRENCE J. EWING,
GEORGE M. McCARTHY,
LIONEL G. VACHON,
INVENTORS

BY Victor J. Evans,
ATTORNEY.

July 15, 1930.  L. G. VACHON ET AL  1,770,537
REPRODUCING APPARATUS
Filed May 27, 1929  4 Sheets-Sheet 2
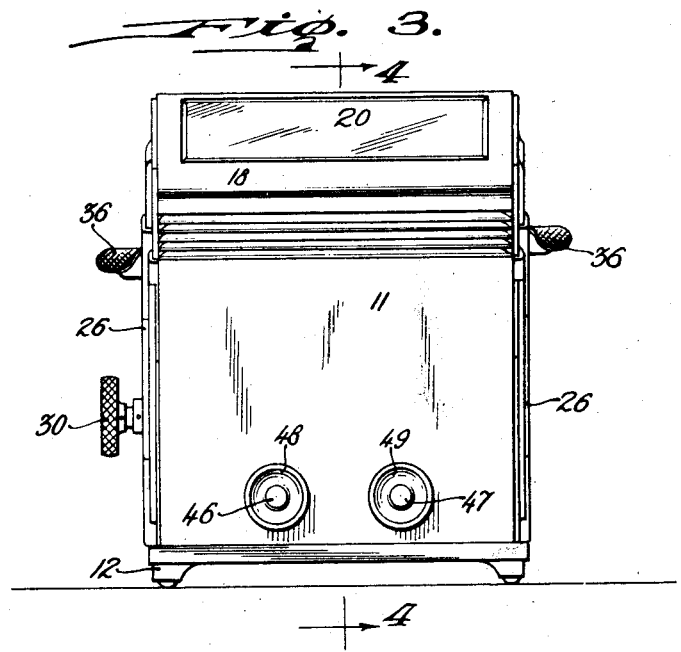
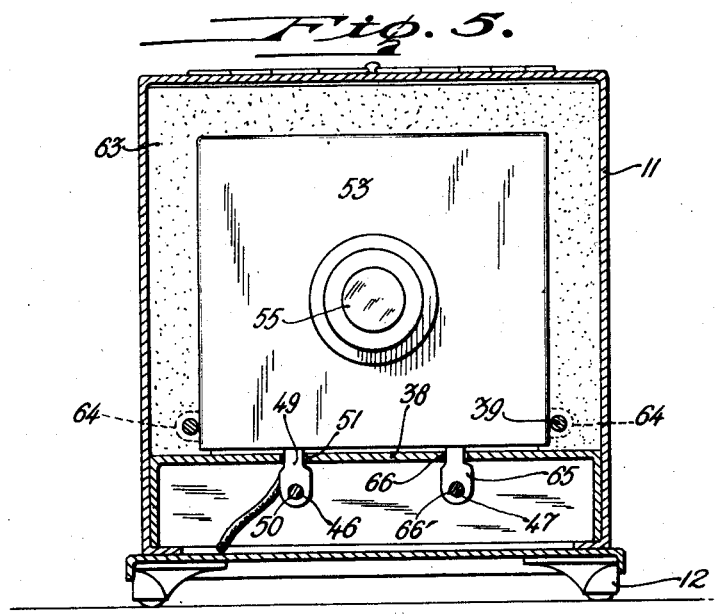

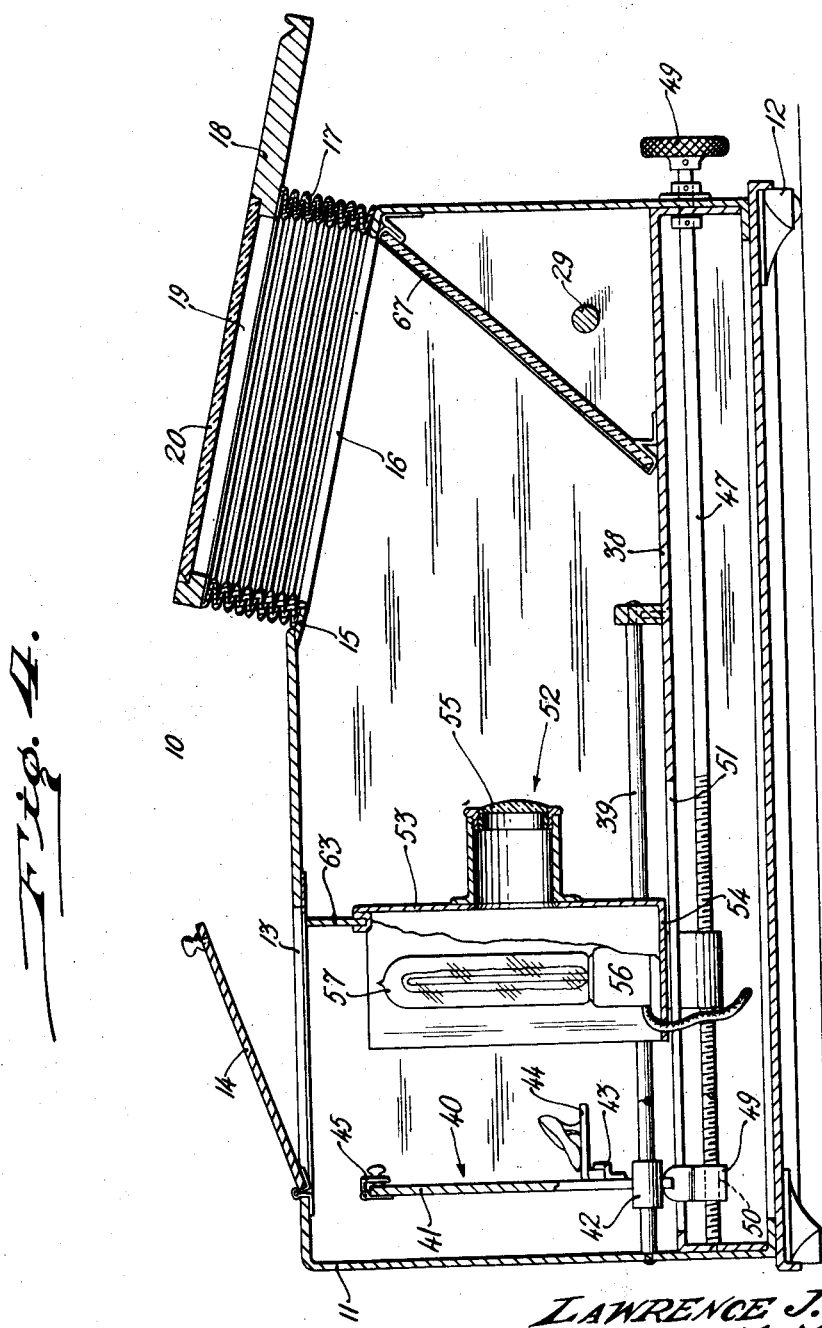

July 15, 1930. L. G. VACHON ET AL 1,770,537
REPRODUCING APPARATUS
Filed May 27, 1929 4 Sheets-Sheet 4

LAWRENCE J. EWING,
GEORGE M. MCCARTHY,
LIONEL G. VACHON,
INVENTORS.

BY Victor J. Evans,
ATTORNEY.

WITNESSES:

Patented July 15, 1930

1,770,537

UNITED STATES PATENT OFFICE

LIONEL G. VACHON, GEORGE M. McCARTHY, AND LAWRENCE J. EWING, OF HAVERHILL, MASSACHUSETTS

REPRODUCING APPARATUS

Application filed May 27, 1929. Serial No. 366,498.

This invention relates to improvements in reproducing apparatus for enlarging or reducing objects, photographs, drawings and the like.

The primary object of the invention resides in an apparatus whereby the image of the subject to be reproduced is reflected through a transparent work support or table on to a sheet placed upon the table, to enable a person to accurately trace the reflected image thereon, the apparatus being provided with adjusting means to either proportionately enlarge or reduce the image with respect to the size of the subject.

Another object of the invention is to provide an enlarging and reducing reproducing apparatus which includes a housing having an adjustable object holder therein, a combined lens and light carrier adjustably mounted with respect to said object holder to enable the focusing of the lens with respect to the object, a mirror onto which the object image is reflected, and an adjustable image receiving table for varying the size of the reflected image received thereon in its natural form from said mirror, the said table being disposed at a forwardly inclined angle for comfort and convenience of a user in tracing the reflected image upon a sheet of translucent paper.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 4 is an enlarged vertical longitudinal sectional view on the line 4—4 of Figure 3.

Figure 5 is a vertical transverse sectional view on the line 5—5 of Figure 1.

Figure 8 is an enlarged detail horizontal sectional view on the line 8—8 of Figure 1.

Figure 1:
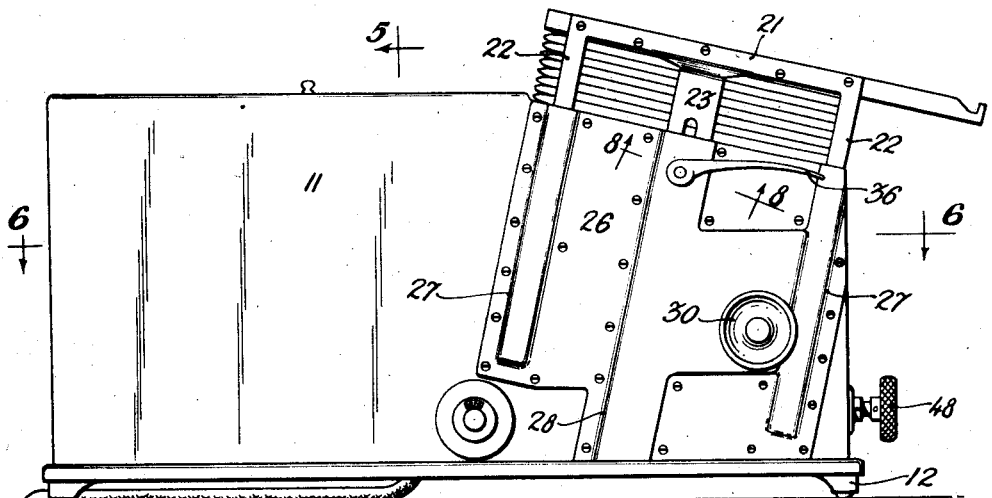
Figure 1 is a side elevational view of our improved reducing and enlarging apparatus.
Figure 2:
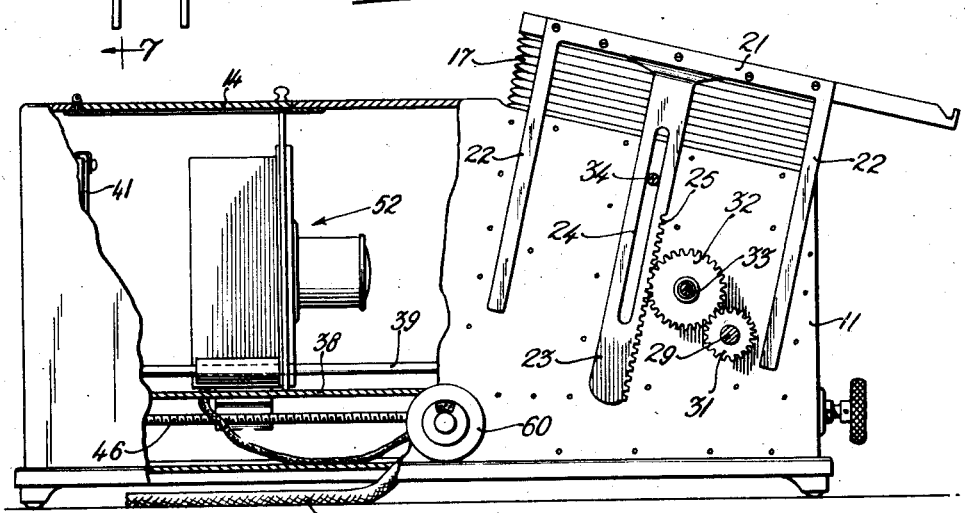
Figure 2 is a similar view with parts broken away in section.
Figure 3:
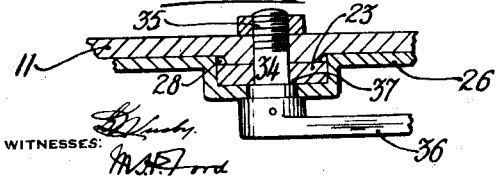
Figure 3 is a front elevational view.
Figure 6:
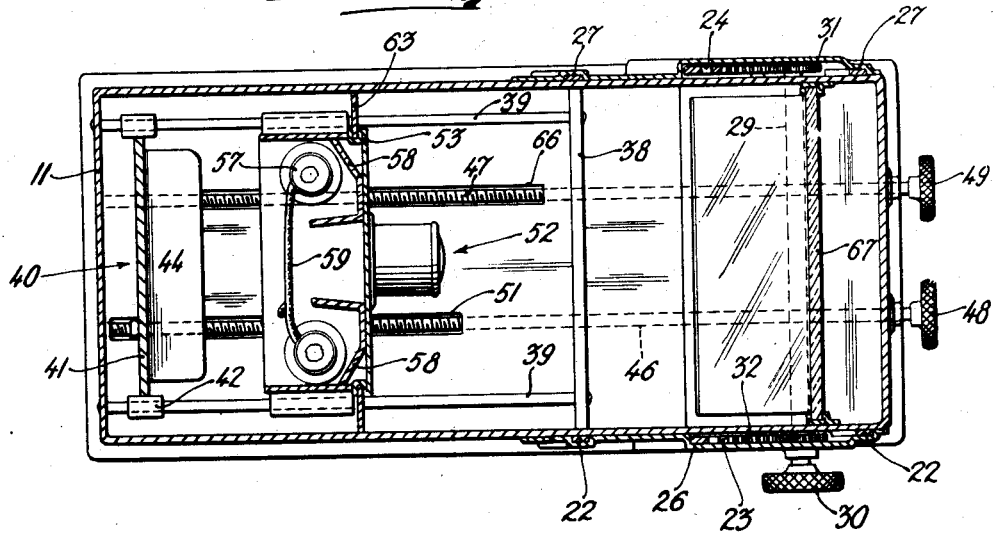
Figure 6 is a horizontal sectional view on the line 6—6 of Figure 1.
Figure 7:
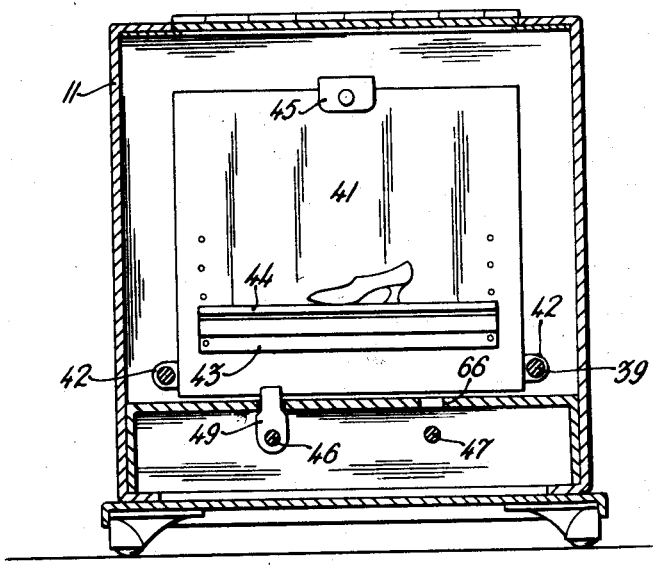
Figure 7 is a vertical transverse sectional view on the line 7—7 of Figure 2.

Referring to the drawing by reference characters, the numeral 10 designates our improved reducing and enlarging apparatus in its entirety and which includes a rectangular or box-like housing 11 supported at its four corners by legs 12. The top of the housing adjacent the rear thereof is provided with an opening 13 by which access may be had to the interior for the purpose of inserting and removing the object or drawing to be enlarged or reduced. A hinged door 14 is provided for closing the opening 13 under normal working condition. The top of the housing at the front thereof is inclined downward as at 15 and is provided with an opening 16 to the walls of which one end of a flexible casing 17 is connected, the said casing 17 being in the form of a bellows and capable of expansion and retraction for a purpose to be presently explained. The outer end of the flexible casing 17 is connected to a work table 18 having an opening 19 therein and which opening is closed by a transparent glass panel 20. The work-table 18 is therefore disposed parallel to the inclined portion 15 of the top which provides a convenient work-rest and also enables an operator to sit at the table and assume a comfortable position.

For supporting the work table in an adjusted position and for guiding the same in its movements to an adjusted position, frames 21 are fixedly attached to opposite sides of the same and which frames straddle the sides of the housing 11. Each frame 21 includes outer parallel legs 22 and a central intermediate longer leg 23. The leg 23 is provided with a longitudinal slot 24 and the outer side edge is provided with rack teeth 25. Housing plates 26 are fastened to opposite sides of the housing 11 and are provided with channels 27 for accommodating the legs 22 and a central channel 28 for receiving the leg 23 of each frame. Journalled in the side walls of the housing 11 and extending transversely thereof is a shaft 29, one end of which extends through one of the housing plates 26 and which end is provided with a manipulating knob 30. Fixed to the shaft 29 and disposed beyond the side walls of the housing are driving gears 31 which constantly mesh with driven gears 32 mounted on stub shafts 33 journalled in the side walls of the housing. These driven gears 32 in turn mesh with the rack teeth 25 on the legs 23 depending from opposite sides of the work-table whereby manual turning of the knob 30 will cause either the raising or the lowering of the work-table depending upon the direction of rotation imparted to the driving shaft 29. The power is transmitted from the shaft 29 through gears 31 and 33 to the leg 23 through the rack teeth 25.

Having described the means for facilitating the adjustment of the work-table, we shall now explain the means by which the work-table may be held in an adjusted position. This means includes bolts 34 extending through the housing plates 26 and side walls of the housing 11 and also through slots 24 in the legs 23, the inner ends of the bolts being threaded with which nuts 35 co-act, and which nuts are held fast to the side walls of the housing so as not to turn upon turning of the bolts. The outer ends of the bolts have handle members 36 fixed thereto by set screws or the like. The inner faces of the heads of the handle members are provided with bearing surfaces 37 which extend through the housing plates for clamping engagement with the outer sides of the legs 23. It will be noted that when the handle members 36 are moved in one direction, a clamping action will be set up between the head of the handle members and the legs 23 and upon turning of the handle members in an opposite direction, the clamping action is released and the table may be raised or lowered to the desired position.

The interior of the housing 11 is provided with a false bottom 38 disposed parallel to the true bottom but in spaced relation with respect thereto. Parallel guide rails 39 are mounted above the bottom 38 in spaced relation thereto and which extend forwardly from the rear wall of the housing and terminate on a plane rearward of the opening 16. Slidably mounted upon the guide rails 39 for longitudinal movement is an object support 40 including a vertical panel 41 having ears 42 extending from its opposite sides and which ears are slidably mounted upon the guide rails 39. The front side of the panel 41 is provided with a bracket 43 which removably receives a shelf 44 on which the object to be enlarged or reduced is placed. In the event that the subject matter is a drawing or photograph, the same is placed on the bracket 43 and held at its top by a clip or holder 45 mounted at the top of the panel 41.

Journalled in the front and rear walls of the housing 11 and disposed below the false bottom 38 are screw shafts 46 and 47, the outer front ends of which carry manipulating knobs 48 and 49, respectively. Fixed to the bottom of the panel 41 and depending therefrom is a lug 49 having a threaded bore 50 through which the threaded portion of the screw shaft 46 extends. The flat sides of the lug 49 freely pass through a longitudinal slot 51 in the false bottom 38 and which slot is disposed directly above the screw shaft 46. It will be noted that by turning the manipulating knob 48, the screw shaft 46 will feed the object support longitudinally within the housing and the limit of movement of the support depends upon the length of the slot 51 as the end walls of the slot act as stops with which the lug 49 engages.

Also disposed within the housing 11 and adjustable with respect to the object support 40 is a lens and lighting assembly 52 which includes a vertical plate 53 terminating in spaced relation to the top and side walls of the housing, and a horizontal rearwardly extending wall 54. The vertical plate 53 supports a projecting lens 55 while the horizontal wall 54 supports electric lamp sockets 56 which are respectively disposed on opposite sides of the range of the lens and which sockets receive electric light lamps 57, the light from which is adapted to be reflected onto the object or subject supported by the object support 41 which reflection is accomplished by mirrors or reflecting surfaces 58. The wires 59 from the lamp sockets 56 lead to an electric switch 60 mounted exteriorly on one of the sides of the housing 11 and to which an electric cord 61 is operatively connected, the said cord having its free end provided with a fixture plug 62 whereby the plug may be inserted into the socket of a wiring system to transmit electrical energy to the electric lamps and which is controlled by the turning "on" or "off" of the switch 60.

The space between the top and side edges of the vertical wall of the plate 53 is closed by a flexible shield 63 carried by the said plate and which serves to prevent light from passing forwardly of the lens so that all of the light from the electric lamps is concentrated upon the object support. Extending from opposite sides of the plate 53 are ears 64 through which the guide rails 39 freely extend. Depending from the horizontal wall 54 is a lug 65 having a threaded bore 66' for accommodating the threaded end of the screw shaft 47, the said lug freely extending through a longitudinal slot 66 in the false bottom 38 and which slot is disposed parallel to the slot 51 but extends to a plane forward thereof to enable the lens and lighting assembly to be adjusted to a position forward of the object support. It will be appreciated that by turning the manipulating knob 49, the screw shaft 47 will feed the lens or lighting assembly in a longitudinal direction with respect to the object support in order to enable the lens 55 to be properly focused with respect to the object to be reproduced.

Mounted at the front end of the housing 11 within the same is a reflecting mirror 67 which is mounted at such an angle with respect to the lens and the transparent panel 20 of the work table so that the image of the object or drawing to be reproduced is received on the mirror from the lens 55 as to be reflected upon the panel 20 on to the sheet of paper placed on the work table on which the reproduction is to be made. It will be appreciated that by projecting the image upon the mirror instead of directly upon the work table, it will of course permit the image to appear right side up when an operator is positioned at the front of the table.

From the foregoing description, it will be appreciated that the image of an object placed upon the shelf 44 may be projected upon the transparent panel 20 or rather on the sheet placed thereover and the size of the image may either be enlarged by raising the work table with respect to the mirror 67 or reduced by lowering the work-table relative thereto. Although, we do not wish to limit ourselves to any particular use to which the invention may be put, we find that it is exceptionally useful in the reproduction of shoes and other objects, photographs or drawings.

While we have described what we deem to be the most desirable embodiment of our invention, it is obvious that many of the details may be varied without in any way departing from the spirit of the invention, and we therefore do not limit ourselves to the exact details of construction herein set forth nor to anything less than the whole of our invention limited only by the appended claims.

What is claimed as new is:—

1. An apparatus of the class described comprising a housing, an object support within said housing, a door in said housing for access to said object support, a combined lens and light producing assembly forward of said object support, a forwardly inclined work table rising above said housing having a transparent panel therein, and a mirror within said housing arranged at an angle with respect to said transparent panel and lens and lighting assembly to receive an image projected thereon by the lens of the lens and lighting assembly and which reflects the same onto said transparent panel right side up, and means for raising and lowering said work table to various adjustable positions to reduce or enlarge the image reflected thereon.

2. In an enlarging and reducing reproducing apparatus, a housing having an opening in the top wall thereof, a forwardly inclined work table adjustably mounted upon said housing including a transparent panel overlying said opening, a bellows like casing between said work table and said housing, a mirror mounted within said housing and disposed at an angle with respect to said transparent panel for receiving an object image and reflecting the same upon said transparent panel, and manipulative means for raising and lowering said work table for enlarging and reducing the size of the image reflected thereon.

3. In an enlarging and reducing reproducing apparatus, a housing having an opening in the top wall thereof, a forwardly inclined work table adjustably mounted upon said housing including a transparent panel overlying said opening, a bellows like casing between said work table and said housing, a mirror mounted within said housing and disposed at an angle with respect to said transparent panel for receiving an object image and reflecting the same upon said transparent panel, and manipulative means for raising and lowering said work table for enlarging and reducing the size of the image reflected thereon, said means including rack bars fixed to said work table, a shaft journalled in the side walls of said housing and extending transversely thereof, drive gears fixed to said shaft, and driven gears meshing with said drive gears and the respective rack bars.

4. In an enlarging and reducing reproducing apparatus, a housing having an opening in the top wall thereof, a forwardly inclined work table adjustably mounted upon said housing including a transparent panel overlying said opening, a bellows like casing between said work table and said housing, a mirror mounted within said housing and disposed at an angle with respect to said transparent panel for receiving an object image and reflecting the same upon said transparent panel, and manipulative means for raising and lowering said work table for enlarging and reducing the size of the image reflected thereon, said means including rack bars fixed to said work table, a shaft journalled in the side walls of said housing and extending transversely thereof, drive gears fixed to said shaft, and driven gears meshing with said drive gears and the respective rack bars, and means for locking said work table in an adjusted position.

5. In an enlarging and reducing reproduction apparatus, a housing having an object support mounted within said housing, a combined lens and light assembly slidably mounted within said housing toward or away from said object support, manipulative means operable exteriorly of said housing for imparting sliding movements to said lens and light assembly, said lens and light assembly including a vertical plate having a lens mounted therein, a rearwardly extending horizontal base plate, electric lamps mounted on said base plate, and reflectors for reflecting the light from said electric lamps rearward onto said object.

6. In an enlarging and reducing reproduction apparatus, a housing having an object support mounted within said housing, a combined lens and light assembly slidably mounted within said housing toward or away from said object support, manipulative means operable exteriorly of said housing for imparting sliding movements to said lens and light assembly, said lens and light assembly including a vertical plate having a lens mounted therein, a rearwardly extending horizontal base plate, electric lamps mounted on said base plate, and reflectors for reflecting the light from said electric lamps rearward onto said object support, and a flexible shield extending from said vertical plate into contact with the inner walls of said housing for preventing light from passing forward thereof.

In testimony whereof we hereby affix our signatures.

LIONEL G. VACHON.
GEORGE M. McCARTHY.
LAWRENCE J. EWING.